US012040938B2

(12) United States Patent
Aggarwal et al.

(10) Patent No.: US 12,040,938 B2
(45) Date of Patent: Jul. 16, 2024

(54) LEARNING ALARM AND PM THRESHOLD VALUES IN NETWORK ELEMENTS BASED ON ACTUAL OPERATING CONDITIONS

(71) Applicant: Ciena Corporation, Hanover, MD (US)

(72) Inventors: Amit Kumar Aggarwal, Gurugram (IN); Rahul Sekhri, Ambala (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/530,716

(22) Filed: Nov. 19, 2021

(65) Prior Publication Data

US 2022/0078073 A1    Mar. 10, 2022

Related U.S. Application Data

(63) Continuation of application No. 16/679,475, filed on Nov. 11, 2019, now Pat. No. 11,184,222.

(30) Foreign Application Priority Data

Sep. 27, 2019  (IN) .............................. 201911039237

(51) Int. Cl.
*H04L 41/0681*  (2022.01)
*H04L 41/16*    (2022.01)
*H04L 43/16*    (2022.01)

(52) U.S. Cl.
CPC .......... *H04L 41/0681* (2013.01); *H04L 41/16* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 7,490,145 B2 * | 2/2009 | Sylor ..................... | H04L 43/00 709/224 |
| 7,630,381 B1 | 12/2009 | Roskind et al. | |
| 10,505,825 B1 * | 12/2019 | Bettaiah ................ | G06F 40/174 |
| 10,541,889 B1 * | 1/2020 | Mishra ................... | H04L 43/08 |
| 2002/0137457 A1 | 9/2002 | Nivens et al. | |
| 2007/0198219 A1 | 8/2007 | Havela et al. | |
| 2008/0117213 A1 | 5/2008 | Cirit et al. | |
| 2010/0329668 A1 * | 12/2010 | Boyd ................. | H04Q 11/0067 398/25 |
| 2011/0307591 A1 * | 12/2011 | Sugata ................... | G06F 11/30 709/223 |
| 2015/0169393 A1 | 6/2015 | Shibuya et al. | |
| 2015/0317197 A1 * | 11/2015 | Blair ..................... | G06N 7/005 714/47.3 |
| 2018/0024901 A1 * | 1/2018 | Tankersley ....... | G06Q 10/06393 707/694 |

(Continued)

*Primary Examiner* — James A Edwards
(74) *Attorney, Agent, or Firm* — Baratta Law PLLC; Lawrence A. Baratta, Jr.

(57) ABSTRACT

Systems and methods include obtaining measured data from a plurality of network elements in a network, wherein the measured data is associated with Operations, Administration, and Maintenance (OAM) functions for each of the plurality of network elements, analyzing the measured data to statistically determine thresholds for any of the OAM functions, and configuring the plurality of network elements with the determined thresholds, wherein the plurality of network element utilize the determined thresholds to compare ongoing measured data for threshold crossings for any of alarms and actions.

17 Claims, 7 Drawing Sheets

(56) References Cited

U.S. PATENT DOCUMENTS

| | | |
|---|---|---|
| 2018/0248905 A1 | 8/2018 | Côté et al. |
| 2019/0147363 A1 | 5/2019 | Maheshwari et al. |
| 2019/0238406 A1* | 8/2019 | Ono ................... H04L 41/0813 |
| 2020/0044943 A1* | 2/2020 | Bor-Yaliniz ........ H04L 41/5012 |

* cited by examiner

LEARNING ALARM AND PM THRESHOLD VALUES IN NETWORK ELEMENTS BASED ON ACTUAL OPERATING CONDITIONS

CROSS-REFERENCE TO RELATED APPLICATIONS

The present disclosure is a continuation of U.S. patent application Ser. No. 16/679,475, filed Nov. 11, 2019, which claims priority to Indian Patent Application No. 201911039237, filed Sep. 27, 2019, the contents of each are incorporated by reference in their entirety.

FIELD OF THE DISCLOSURE

The present disclosure generally relates to networking. More particularly, the present disclosure relates to systems and methods for learning alarm and Performance Monitoring (PM) threshold values in network elements based on actual operating conditions.

BACKGROUND OF THE DISCLOSURE

Networks at various layers (optical, packet, Time Division Multiplexed (TDM), Internet Protocol (IP), combinations thereof, etc.) are realized by physical networking hardware including network elements. Network elements can include, for example, switches, routers, terminals, etc. During operation, various parameters are monitored for Operations, Administration, and Maintenance (OAM) purposes. Such parameters may include Performance Monitoring (PM) data, Key Performance Indicators (KPIs), etc. As described herein, such monitored data may have a so-called threshold that crossing is indicative of some defect, warning, alarm, anomalous behavior, etc. A threshold is used to set a comparison, and it can be a greater than (or equal) value, a less than (or equal) value, etc. The conventional approach includes default values or user-configured values for thresholds, i.e., absolute, hardcoded values. Default values may be arrived at based on when components on a device may start malfunctioning, namely based on a lab environment or the like. This one-size-fits-all approach has limited effectiveness as it may mask several problem indications. And it becomes very cumbersome for network operators to come up with right set of thresholds of different KPIs for different devices deployed in different hierarchy and geographical conditions. Other types of parameters may not have default values as such values are impossible to generalize and are specific to an operating environment. For example, these types may include Cyclic Redundancy Check (CRC) errors, temperature, memory usage, packet loss, etc. These parameters are typically not even set as it is difficult to come up with proper threshold values.

Drawbacks of conventional thresholds include i) deployment of different features need thorough investigations to determine realistic thresholds, ii) thresholds configured too low or high make the feature ineffective or too noisy, and iii) an absolute configured number may be the right threshold for that time, but the right threshold may change over the course of time. Conventionally, it is difficult to change those values periodically.

BRIEF SUMMARY OF THE DISCLOSURE

The present disclosure relates to systems and methods for learning alarm and Performance Monitoring (PM) threshold values in network elements based on actual operating conditions. The present disclosure includes a framework for operation on a network element or device that i) includes the ability to self-learn the operating field environment based on user-defined intervals, ii) includes dynamic re-learning of changing operating conditions and recalibrating KPI thresholds, iii) leads to factual alarms and action triggering (proactive/corrective) based upon real operating environmental periodic re-learnings, and iv) has individual devices in the same network determining their own thresholds based upon their role. That is, the present disclosure includes mechanisms to come up with right set of thresholds based upon learning from actual operating environmental conditions. With periodically self-learning windows, a network element or device will be able to adjust the thresholds with changing environmental and provisioning changes. The present disclosure enables i) streamlining of threshold setting for a number of available features, PMs, KPIs, etc. on a network element or device, ii) role-based thresholding, iii) improved speed and accuracy in threshold determination, and iv) periodic recalibration.

In an embodiment, a method and a non-transitory computer-readable medium having instructions stored thereon is configured to program a processing device to perform the steps of obtaining measured data associated with one or more parameters associated with operation of a network element in a network, wherein the measured data is over a learning window; analyzing the measured data to statistically determine thresholds for the one or more parameters; and configuring the network element with the determined thresholds for the one or more parameters, wherein the network element is configured to compare ongoing measurements of the one or more parameters with the determined thresholds, and to use any threshold crossings for any of alarming and actions on the network element.

The non-transitory computer-readable medium or the method can further include, subsequent to a predetermined time period after the configuring, recalibrating the thresholds for the one or more parameters based on updated measured data and reconfiguring the network element with the recalibrated thresholds for the one or more parameters. The determined thresholds can be automatically determined utilizing a statistical technique on the measured data which establishes a fence where being outside of the fence is indicative of a deviation. The one or more parameters can include Performance Monitoring (PM) data and Key Performance Indicators (KPIs). The one or more parameters can relate to any of optical layer parameters, Time Division Multiplexing (TDM) layer parameters, and packet layer parameters. The determined thresholds can include an inner fence indicative of a minor deviation and an outer fence indicative of a major deviation. The network element can be a first network element and the network can include a second network element, wherein the first network element and the second network element include different thresholds for a same parameter.

In another embodiment, a network element includes a plurality of ports connected to a network; and a controller configured to obtain measured data associated with one or more parameters associated with operation of the plurality of ports, wherein the measured data is over a learning window, analyze the measured data to statistically determine thresholds for the one or more parameters, configure the determined thresholds for the one or more parameters, and compare ongoing measurements of the one or more parameters with the determined thresholds, and to use any threshold crossings for any of alarming and actions.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a processing device which may be used for a Network Management System (NMS), for a shelf processor or controller that is part of the network elements or the like;

DETAILED DESCRIPTION OF THE DISCLOSURE

Again, the present disclosure relates to systems and methods for learning alarm and Performance Monitoring (PM) threshold values in network elements based on actual operating conditions. The present disclosure includes a framework for operation on a network element or device that i) includes the ability to self-learn the operating field environment based on user-defined intervals, ii) includes dynamic re-learning of changing operating conditions and recalibrating KPI thresholds, iii) leads to factual alarms and action triggering (proactive/corrective) based upon real operating environmental periodic re-learnings, and iv) has individual devices in the same network determining their own thresholds based upon their role. That is, the present disclosure includes mechanisms to come up with right set of thresholds based upon learning from actual operating environmental conditions. With periodically self-learning windows, a network element or device will be able to adjust the thresholds with changing environmental and provisioning changes. The present disclosure enables i) streamlining of threshold setting for a number of available features, PMs, KPIs, etc. on a network element or device, ii) role-based thresholding, iii) improved speed and accuracy in threshold determination, and iv) periodic recalibration.

Network Element/Device

Figure 1:
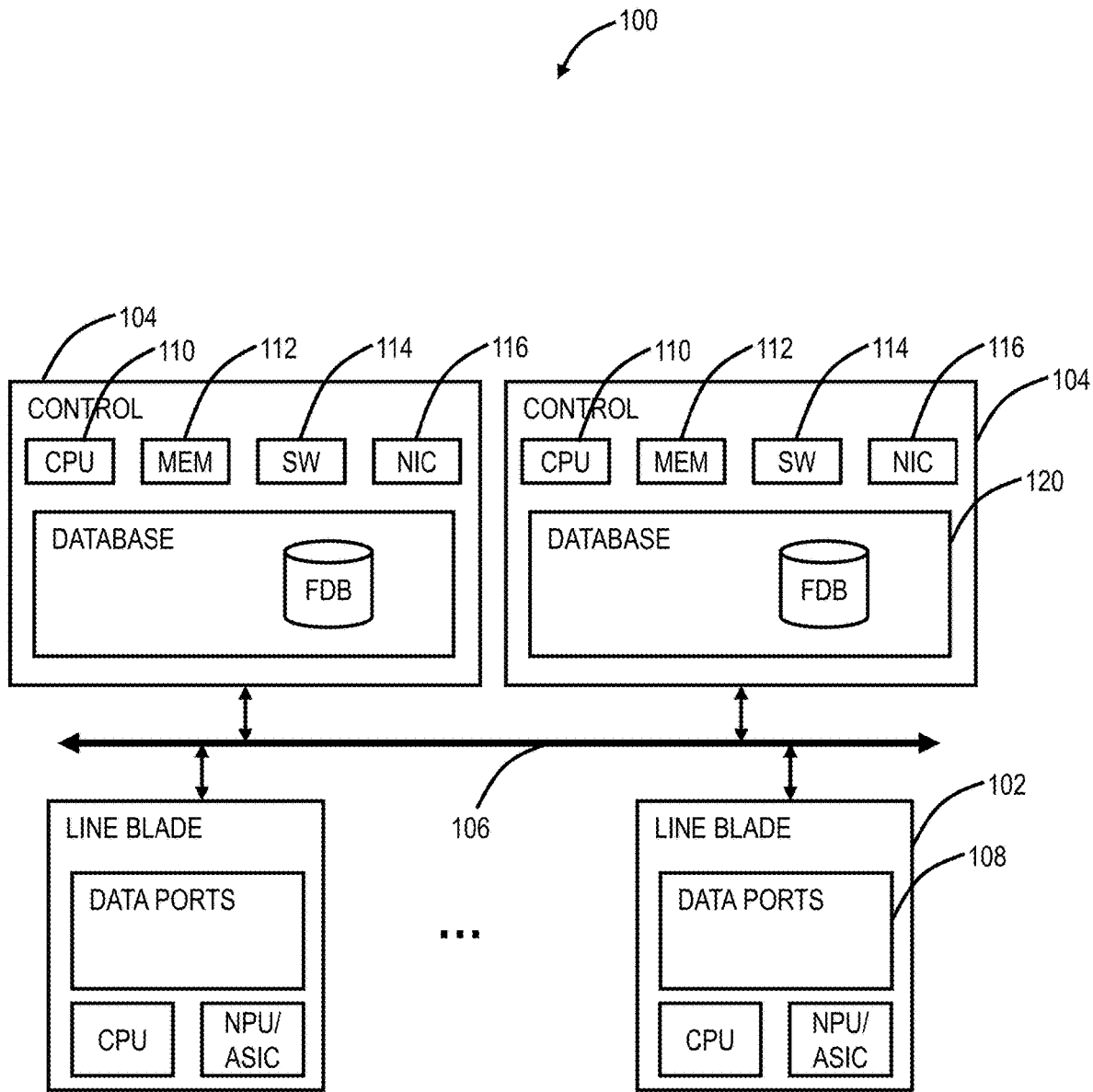
FIG. 1 is a block diagram of an implementation of a network element.

FIG. 1 is a block diagram of an implementation of a network element 100. As described herein, a network element can also be referred to as a network node, a network device, etc. In this embodiment, the network element 100 is an Ethernet network switch, but those of ordinary skill in the art will recognize the systems and methods described herein can operate with other types of network elements and other implementations. In this embodiment, the network element 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the network element 100. Each of the blades 102, 104 can include numerous electronic devices and/or optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the network element 100 out by the correct port 108 to the next network element 100 or a subtending device. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the network element 100. The network interface 116 may be utilized to communicate with an element manager, a network management system, etc. Additionally, the control blades 104 can include a database 120 that tracks and maintains provisioning, configuration, operational data, and the like. In this embodiment, the network element 100 includes two control blades 104 which may operate in a redundant or protected configuration such as 1:1, 1+1, etc.

Figure 2:
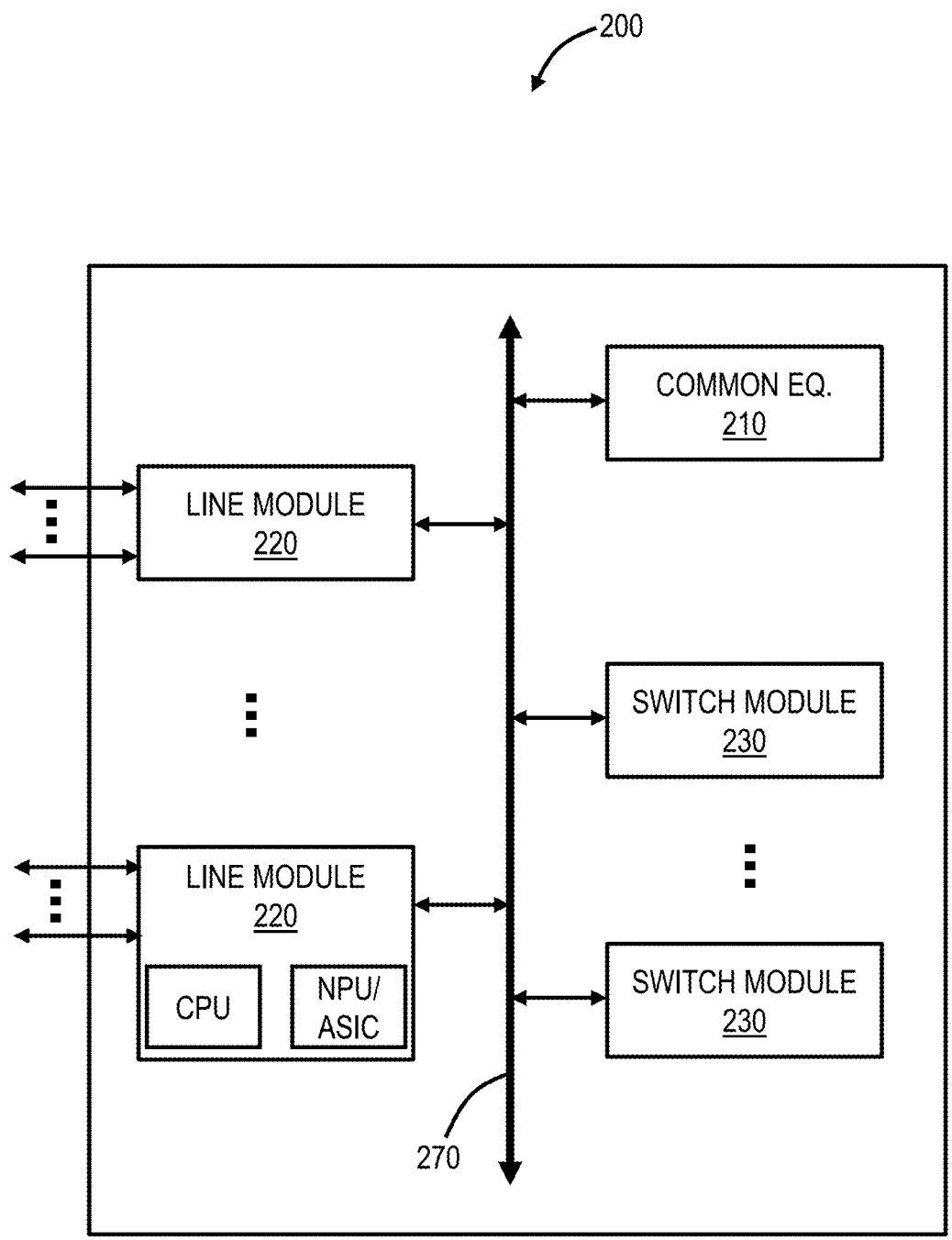
FIG. 2 is a block diagram of another implementation of a network element.

FIG. 2 is a block diagram of another implementation of a network element 200. For example, the network element 100 can be a dedicated switch, whereas the network element 200 can be a multiservice platform. In an embodiment, the network element 200 can be a nodal device that may consolidate the functionality of a Multi-Service Provisioning Platform (MSPP), Digital Cross-Connect (DCS), Ethernet and Optical Transport Network (OTN) switch, Dense Wave Division Multiplexed (DWDM) platform, etc. into a single, high-capacity intelligent switching system providing Layer 0, 1, and 2 consolidation. In another embodiment, the network element 200 can be any of an Add/Drop Multiplexer (ADM), an MSPP, a DCS, an optical cross-connect, an optical switch, a router, a switch, a DWDM terminal, an access/aggregation device, etc. That is, the network element 200 can be any system with ingress and egress signals and switching of packets, channels, timeslots, tributary units, wavelengths, combinations thereof, etc.

In an embodiment, the network element 200 includes common equipment 210, one or more line modules 220, and one or more switch modules 230. The common equipment 210 can include power; a control module; Operations, Administration, Maintenance, and Provisioning (OAM&P) access; and the like. The common equipment 210 can connect to a management system such as a Network Management System (NMS), an Element Management System (EMS), or the like. The network element 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the network element 200. In an embodiment, the line modules 220 can form ingress and egress switches with the switch modules 230 as center stage switches for a three-stage switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short-reach interfaces, and the like, and can connect to other line modules 220 on remote network elements, end clients, routers, switches, and the like. From a logical perspective, the line modules 220 provide ingress and egress ports to the network element 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity such as Optical Channel Data Unit-k (ODUk) Optical Channel Data Unit-flex (ODUflex), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1: N, etc.

In the context of the systems and methods described herein, the network element 100, 200 include various PMs, KPIs, and other parameters with settable threshold values. As described herein, the term parameter is used to globally refer to any value that is monitored during operation of the network element 100, 200, including PMs, KPIs, etc.

Network Management System

Figure 3:
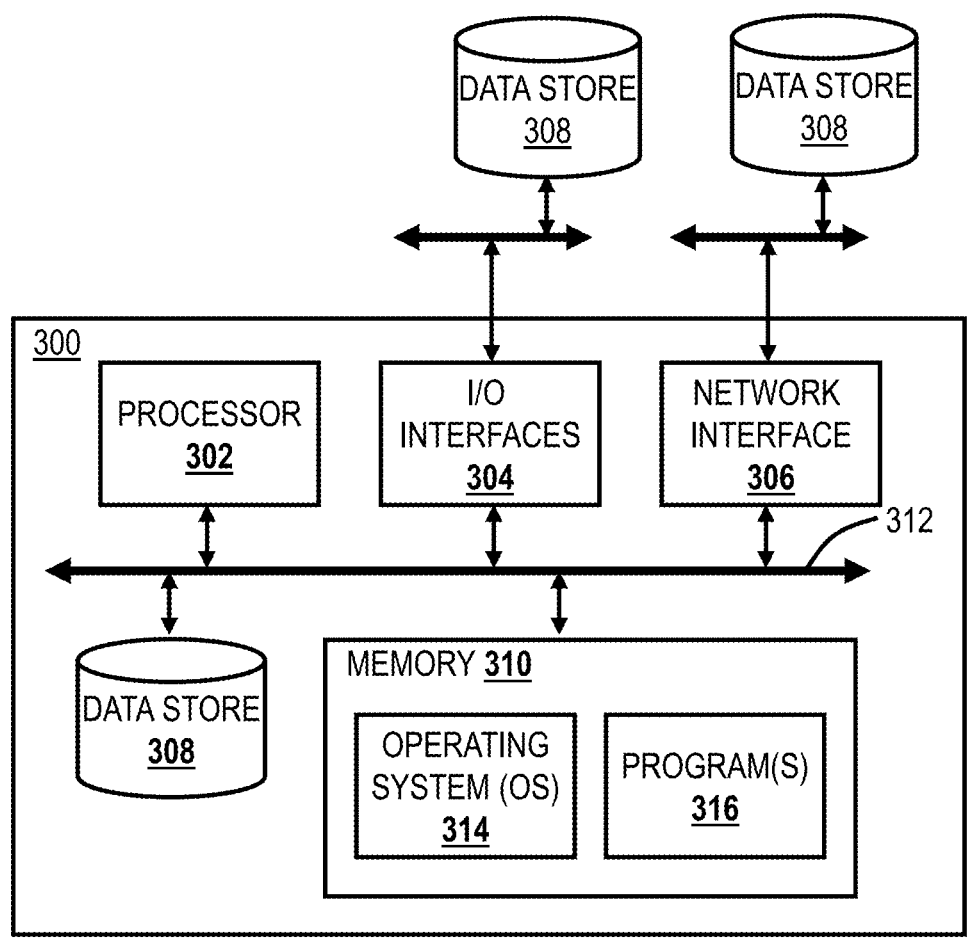

FIG. 3 is a block diagram of a processing device 300 which may be used for a Network Management System (NMS), for a shelf processor or controller that is part of the network elements 100, 200 or the like. The processing device 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the processing device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the processing device 300, a semiconductor-based microprocessor (in the form of a microchip or chipset), or generally any device for executing software instructions. When the processing device 300 is in operation, the processor 302 is configured to execute software stored within the memory 310, to communicate data to and from the memory 310, and to generally control operations of the processing device 300 pursuant to the software instructions. The I/O interfaces 304 may be used to receive user input from and/or for providing system output to one or more devices or components. The user input may be provided via, for example, a keyboard, touchpad, and/or a mouse.

The network interface 306 may be used to enable the processing device 300 to communicate over a network. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the processing device 300 such as, for example, an internal hard drive connected to the local interface 312 in the processing device 300. Additionally, in another embodiment, the data store 308 may be located external to the processing device 300 such as, for example, an external hard drive connected to the I/O interfaces 304 (e.g., SCSI or USB connection). In a further embodiment, the data store 308 may be connected to the processing device 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Network

Figure 4:
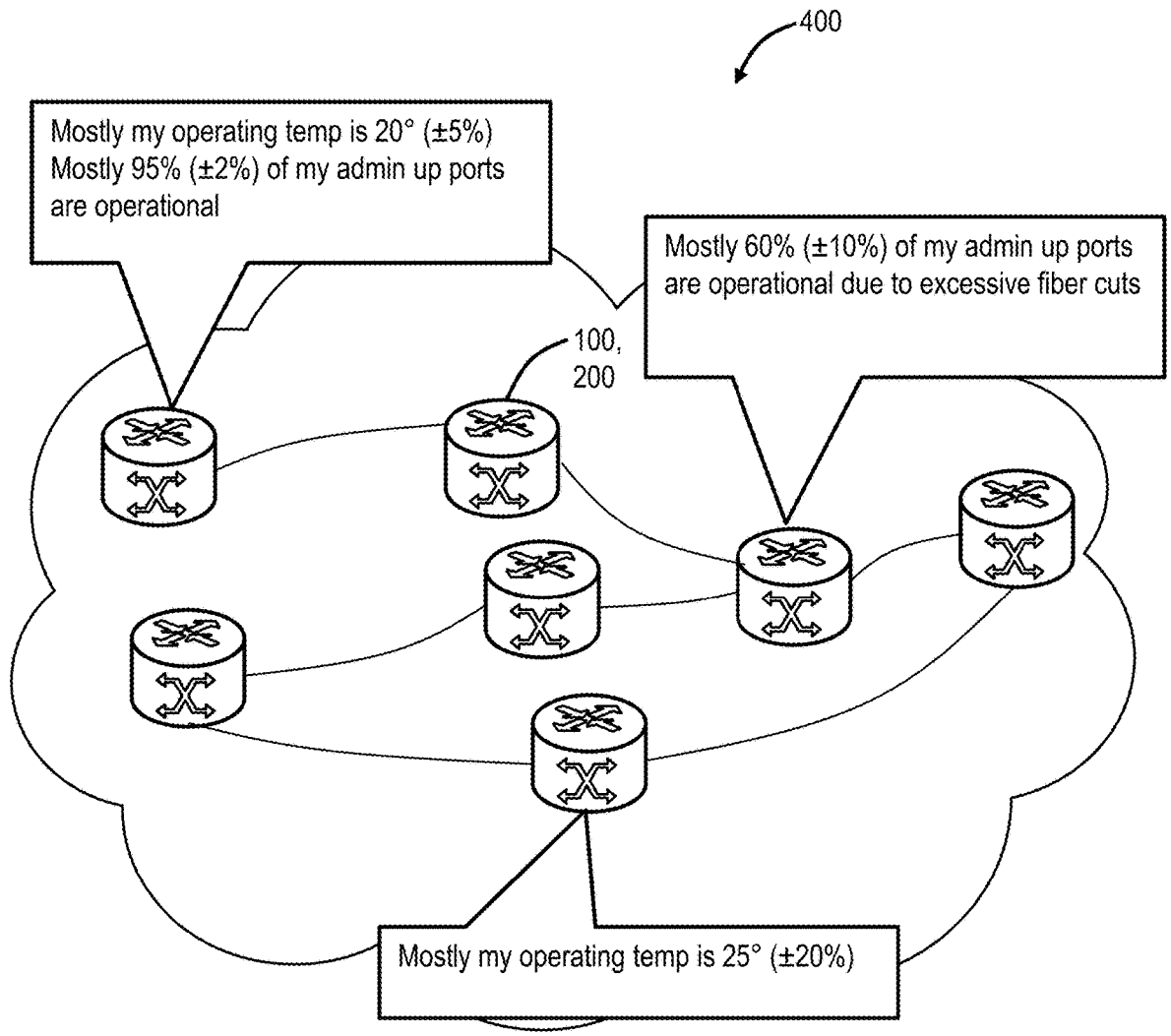
FIG. 4 is a network diagram of a network with network elements spread over a geographic region.
Figure 5:
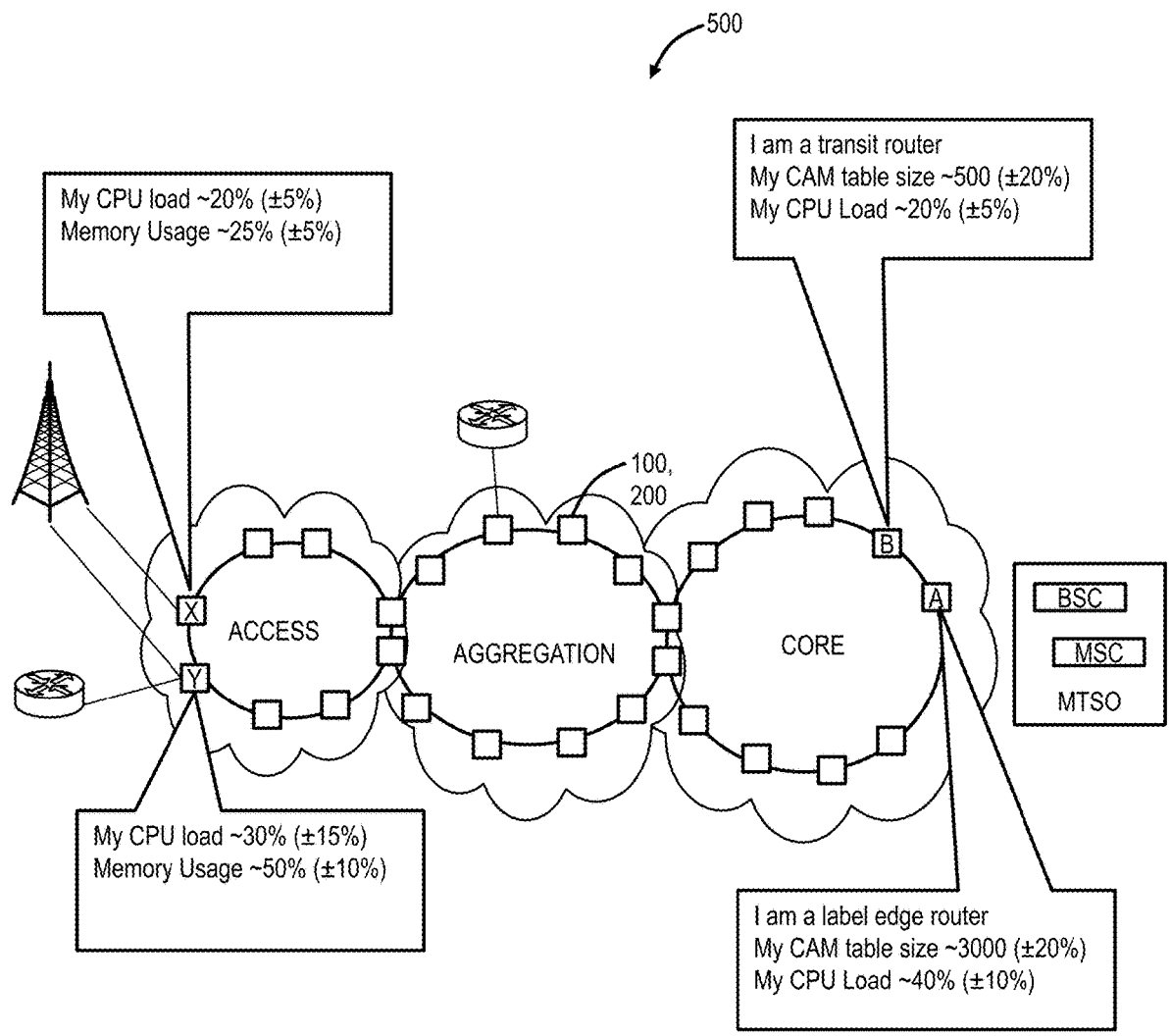
FIG. 5 is a network diagram of a multi-layer network with network elements in an access, aggregation, and core network.

FIG. 4 is a network diagram of a network 400 with network elements 100, 200 spread over a geographic region. FIG. 5 is a network diagram of a multi-layer network 500 with network elements 100, 200 in an access, aggregation, and core network. In addition to providing the desired functionality/services, the network elements 100, 200 are expected to provide features required to monitor network health and take proactive/corrective actions to minimize service disruptions. For such features, network operators need to come up with a list of parameters to be monitored and subsequently identify right threshold values; beyond which feature should trigger an alarm and/or take action. If a threshold is reached, it implies that service quality has degraded enough that it may potentially cause network outage; hence action is required to avoid the same.

Having thresholds too high (or too low) will result in parameters either becoming ineffective or too noisy. Quite often, such thresholds depend heavily on actual environmental conditions under which production network is operating. In FIG. 4, for example, temperature, transport media quality, frequency of power fluctuations, and fiber cuts, etc. Hence, Lab certification testing does not help much in identifying appropriate threshold settings. For example, with respect to operating temperature as a parameter, one network element 100, 200 may see operating temperature of 20°±5% whereas another network element 100, 200 may see 25°±20%, a much wider variation, such as due to climate differences, building differences, etc. For another parameter, one network element 100, 200 may see administrative up ports operational 95% of the time±2% whereas another network element 100, 200 may see administrative up ports operational 60% of the time±10% due to excessive fiber cuts in the area. Since this data is not available today, network operators often assume the worst case scenario and set too high thresholds. Of course, one set of threshold values for each of these parameters would be ineffective for both.

Often, there is no straightforward way to collectively assess all these dimensions, and network planning teams cannot afford to experiment in live networks. To make the matter worse, operating network environment also changes in due course of time. As a result, such features either never get enabled in production networks or they become ineffective enough that network operator starts ignoring the alarms raised by them.

Further, multiple network elements 100, 200 placed in the same part of the network may carry different traffic type (broadcast/multicast/unicast) and/or different quality of service, as in FIG. 5. Hence, the network operator may need to set different thresholds. For example, one parameter may be CPU load, and the network elements can vary, such as ~20%±5%, ~30%±15%, or ~40%±10%. Another parameter may be memory usage such as ~25%±5% or ~50%±10%. A third parameter may be CAM table size such as ~500±20% at a transit router or ~3000±20% at a label router.

Learning to Set Thresholds

The present disclosure provides capabilities on the network element 100, 200 to self-learn the environmental conditions during operation for setting various threshold values on various parameters. To achieve this, the network elements 100, 200 allow a configured "learning window" during which it will observe the behavioral pattern of various parameters. This self-learning mode can be on-demand or periodic. For the periodic mode, a user can provide a duration for the learning window and a gap between consecutive learning windows (i.e., a refresh timer). For example, a user can configure the learning-window duration of 4 days and re-learning period after every 30 days, allowing the network element 100, 200 to learn the environmental conditions it is operating in for 4 days and will re-learn the parameters after refresh timer of every 30 days, as shown in FIG. 6 which is a diagram of time illustrating a sliding learning window 600.

Figure 6:
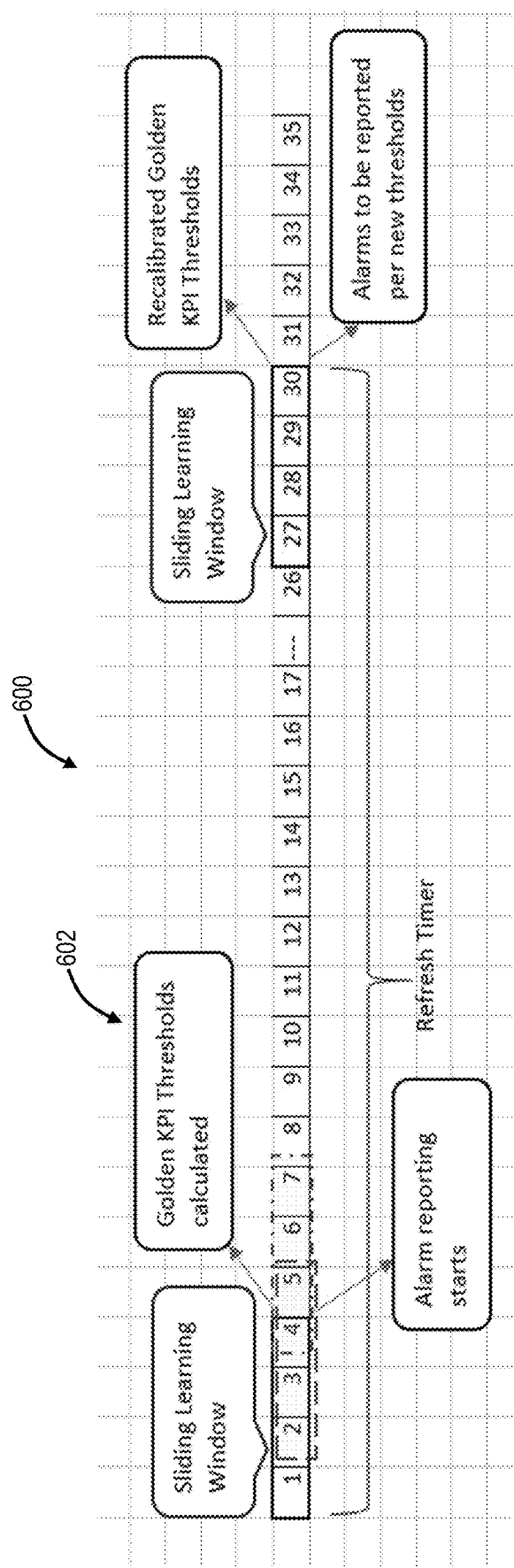
FIG. 6 is a diagram of time illustrating a sliding learning window.

In FIG. 6, after a network element 100, 200 has learned the dataset range of user-specified KPIs, the network element 100, 200 can use any statistical computation technique to arrive at the most common range and the tolerance level a given KPI is varying in; which will be referred as golden KPI thresholds 602. Any deviations from golden KPI thresholds will trigger an alarm, i.e., a threshold crossing. Optionally, features used for monitoring device health can be configured based on these thresholds to trigger corrective/preventive actions, such as a protection switch. After the refresh time, the sliding learning window 600 can be implemented again, and the golden KPI thresholds can be recalibrated.

Advantageously, the learning window 600 occurs during actual field operation of the network element 100, 200, and accordingly reflects the actual operating conditions. Conventionally, network operators have no mechanism to find out what a particular network element 100, 200 is experiencing. Thresholds are a single threshold to be applied to all network elements in the field. However, this one-size-fits-all approach may result in either lot of noise or absolute silence. In general, "lot of alarms" causes distraction and hence can seldom be helpful. Ideally, one should first address more severe issues and then focus on the next level of issues. This feature will do just that: it will keep on recalibrating the baseline and will report only major deviations. Once those are addressed, inner/outer fences will automatically get adjusted, and next set of deviations will be reported.

The learning window 600 can be a user-configurable parameter, and the user may define it appropriately for different KPIs based on how dynamically their network changes. For example, if the addition of more channels causes optical power increase outside of golden learned KPIs, warning/alarm will be raised, which will bring it to user attention. This is quite helpful in today's context because multiple teams operate on the same network in parallel.

The learning window 600 introduces evolution and adaptation on each individual network element 100, 200 with respect to threshold values. Further, the present disclosure introduces variability between different network elements 100, 200. For example, the normal CPU load on an access device may be 20%; whereas it may be 50% on an edge router. Today, a user may set 70% as threshold on all devices. Imagine if CPU load starts hovering around 40% on an access device; this could very well be an indication of potential failure. The present disclosure is able to flag such anomalies and provide the operator opportunity to take preventive action.

Threshold Determination

In an embodiment, a network element 100, 200 can use the Interquartile Range (IQR) statistical technique to calculate the inner/outer fences for learned KPI dataset values to arrive at a golden KPI threshold. The interquartile range statistical includes breaking data into quartiles $Q_1$, $Q_2$, $Q_3$. The quartiles $Q_1$, $Q_2$, $Q_3$ are calculated recursively by using median, and the $IQR=Q_3-Q_1$. For example, if the number of entries is an even number 2n, then $Q_1$ is the median of the n smallest entries and $Q_3$ is the median of the n largest entities. If the number of entries is an odd number 2n+1, similarly, then $Q_1$ is the median of the n smallest entries and $Q_3$ is the median of the n largest entities. Other techniques are also contemplated, including automated calculations and manual determinations. Of note, an aspect here is the automation of the calculation, allowing the periodic learning and automatic determination of thresholds.

The following provides some examples using the Interquartile range formula. Again, other statistic techniques are contemplated. Also, these parameters are presented as an example for illustration purposes only; other parameters are also contemplated.

Assume temperature data set values reported during a learning window as 25, 22, 22, 23, 34, 22, 26, 27, 30, 30, 22. By using the interquartile range formula, inner and outer fences can be calculated, as shown below.

Put the numbers in ascending order: (22, 22, 22, 22, 23), 25, (26, 27, 30, 30, 34).

Hence, 25 is the median of overall numbers, $Q_1=22$ is the median of the first half, and $Q_3=30$ is median of second half. Calculated $Q_1=22$, $Q_3=30$ and $IQR=Q_3-Q_1=8$.

The quartile values $Q_1$, $Q_3$ are measurements of the $75^{th}$ and $25^{th}$ percentiles of measured data. These $75^{th}$ and $25^{th}$ percentiles can now be used to determine threshold values. Note, the quartile values $Q_1$, $Q_3$ themselves cannot be used as thresholds as this would lead to significant crossings, i.e., these values are well within the data sample.

In an embodiment, the $75^{th}$ and $25^{th}$ percentiles are used to establish inner fences and outer fences, for future measured data. The inner fences can be used to signify a warning or minor alarm when these thresholds are crossed. The outer fences can be used to signify a critical or major alarm when these thresholds are crossed. The values of the inner fences and the outer fences are based on the statistical values from the measured data, e.g., here with IQR, the inner fences and the outer fences are based on the quartile values $Q_1$, $Q_3$, and the IQR.

The following provides an example calculation based on the above example using temperature data.

Inner fences: Lower Bound=$Q_1-(1.5*(IQR))$=10° C.
and Upper Bound=$Q_3+(1.5*(IQR))$=42° C.

Outer fences: Lower Bound=$Q_1-(3*(IQR))$=-2° C.
and Upper Bound=$Q_3+(3*(IQR))$=54° C.

In this example, the network element 100, 200 will report a warning if the temperature goes below 10° C. or goes above 42° C., also the network element 100, 200 will report a severe Alarm if temperature goes below -2° C. or goes above 42° C. Note, the values 1.5 and 3 in the above equations are predetermined constants used to establish a range of acceptable values based on the measured statistics.

In a second example, CPU load % from a device operating in field environment is recorded as: 35, 30, 29, 37, 38, 40, 35, 65, 34, 34, 38.

Put the numbers in ascending order: (29, 30, 34, 34, 35), 35, (37, 38, 38, 40, 65).

Hence, 35 is the median of overall numbers, $Q_1=34$ is the median of first half, and $Q_3=38$ is median of second half. Calculated $Q_1=34$, $Q_3=38$, and IQR=Q3−Q1=4 from the CPU load dataset values.

Inner fences: Lower Bound=$Q1-(1.5*(IQR))$=28%
and Upper Bound=$Q3+(1.5*(IQR))$=44%.

Outer fences: Lower Bound=$Q1-(3*(IQR))$=22%
and Upper Bound=$Q3+(3*(IQR))$=50%.

In this example, the network element 100, 200 will report a warning if CPU load goes below 28% or goes above 44%, also the network element 100, 200 will report severe Alarm if CPU load goes below 22% or goes above 50%. Here, 65% CPU load observed in dataset during learning-window itself is outlier and can be flagged to user.

System Settings and Actions

Once the network element 100, 200 has calculated the golden KPI thresholds (inner/outer fences), these values are set and used for threshold crossings, i.e., deviations from golden KPI thresholds will trigger an alarm. For example, the user can be provided a configurable option to auto-apply (or review and manually apply) them as thresholds. Optionally, actions such as signal degrade-based switching can be enabled by the user, e.g., when frame loss is observed outside of golden KPI thresholds, then an action such as switching to a backup path can be triggered.

In an embodiment, the network element 100, 200 will only save the KPI thresholds results for last running "learning-window" period, and those results will be available on the network element 100, 200 for the user to view, such as via a management system interface. In another embodiment, the results can also be forwarded to the cloud or to a central repository for storage, analytics, etc. Mining of this data will enable network planning teams to identify potential issues in overall network design and operating environment. For example, a particular network device needs to be replaced with more powerful device or better temperature regulation is required in certain segment of network, etc. For example, a large sample of network elements 100, 200 operating in different networks, under different conditions, etc. can be used to establish initial threshold values in the future.

If any outliers are observed during a learning-window can be flagged to the user, and user can take corrective action and restart the on-demand learning test to have appropriate dataset in normal operating conditions.

Parameters

The network elements 100, 200 generate Performance Monitoring (PM) information, alarms, and/or logging data, i.e., the parameters, KPIs, etc. These include things like power levels, error counters, received, transmitted or dropped packets, Central Processing Unit (CPU) utilization, geo-coordinates, threshold cross, etc. Communication channels (or "services") also generate PM data, for all layers of the Open Systems Interconnection (OSI) model (ISO/IEC standard 7498-1, 1994). For instance, Layer 3 (IP) network performance is characterized by bandwidth, throughput, latency, jitter, and error rate. Some examples of parameters that can be learned using the present disclosure include, e.g., CPU usage, Memory usage, Number of active users, Transceiver (XCVR) diagnostic readings, Content Addressable Memory (CAM) table size, Number of routes, CRC/Error packet count, Traffic rates, Number of operationally ports out of admin up ports, and the like.

Each time any of the above data is collected, it can be compared with a settable threshold. The present disclosure provides a technique for setting a proper, realistic threshold for any parameter based on a learning process. Again, the network can include an optical layer (e.g., Dense Wavelength Division Multiplexing (DWDM), etc.), a Time Division Multiplexing (TDM) layer (e.g., Optical Transport Network (OTN), Synchronous Optical Network (SONET), Flexible Ethernet (FlexE), etc.), a packet layer (e.g., Ethernet, Multiprotocol Label Switching (MPLS), Internet Protocol (IP), etc.), and the like. Those skilled in the art will recognize actual network implementations can span multiple layers. The present disclosure can operate at a single layer or concurrently at multiple layers. Each of these layers can include associated parameters which describe the operational status over time at the layer.

Examples of parameters include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port-level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/service. The alarm data can be various types of alarms supported by a network element (e.g., chassis, MPLS, SECURITY, USER, SYSTEM, PORT, SNMP, BGP-MINOR/WARNING/MAJOR/CRITICAL, etc.). The hardware operating metrics can include temperature, memory usage, in-service time, etc. Video quality metrics may include the number of re-buffering events, number of video codec rate changes, or data submitted by users such as thumbs up or thumbs down after a video conference call.

Throughout, the term "network element" (NE) can interchangeably refer to any of a variety of network devices, such as nodes, shelves, cards, ports, or even groups of such NEs. Regardless of the identity of the elements, however, the technique described herein for determining the normalcy of their behavior remains similar and remains valid as long as the relevant data for each element is accessible to the anomaly detection software application.

The following Table 1 provides some example parameters which can be used herewith. Those of ordinary skill in the art will appreciate this list is non-exhaustive and presented for illustration purposes only:

| | |
|---|---|
| CV-PCS | Code violation, physical coding sublayer |
| DFR-E | Discarded frames, Ethernet |
| DROPGAINAVG-OTS | Drop Gain Average - Optical Transmission Section |
| DROPGAINMAX-OTS | Drop Gain Maximum - Optical Transmission Section |
| DROPGAINMIN-OTS | Drop Gain Minimum - Optical Transmission Section |
| DROPGAIN-OTS | Drop Gain - Optical Transmission Section |
| ES-E | Errored seconds, Ethernet |
| ES-ODU | Errored seconds, optical channel data unit |
| ES-OTU | Errored seconds, optical channel transport unit |
| FC-ODU | Failure count, optical channel data unit |
| FCSERR-E | FCS errors, Ethernet |
| FEC-OTU | Forward error correction, optical channel transport unit |
| HCCS-OTU | High correction count seconds, optical channel transport unit |
| INFRAMES-E | In frames, Ethernet |
| INFRAMESERR-E | In errored frames, Ethernet |
| OPINAVG-OTS | Optical Return Loss Average (in dB) - Optical Transmission Section |
| OPINMAX-OTS | Optical Return Loss Maximum (in dB) - Optical Transmission Section |
| OPINMIN-OTS | Optical Return Loss Minimum (in dB) - Optical Transmission Section |
| OPIN-OTS | Optical Return Loss (in dB) - Optical Transmission Section |
| OPOUTAVG-OTS | Optical Power Output Average (in dBm) - Optical Transmission Section |
| OPOUTMAX-OTS | Optical Power Output Maximum (in dBm) - Optical Transmission Section |
| OPOUTMIN-OTS | Optical Power Output Minimum (in dBm) - Optical Transmission Section |
| OPOUT-OTS | Optical Power Output (in dBm) - Optical Transmission Section |
| OPRAVG-OCH | Optical power received Average - Optical Channel |
| OPRMAX-OCH | Optical power received Maximum - Optical Channel |
| OPRMIN-OCH | Optical power received Minimum - Optical Channel |
| OPRN-OCH | Optical power received Normalized - Optical Channel |
| OPR-OCH | Optical power received - Optical Channel |
| OPTAVG-OCH | Optical Power Transmitted Average (in dBm) - Optical Channel |
| OPTMAX-OCH | Optical Power Transmitted Maximum (in dBm) - Optical Channel |
| OPTMIN-OCH | Optical Power Transmitted Minimum (in dBm) - Optical Channel |
| OPTN-OCH | Optical Power Transmitted Normalized (in dBm) - Optical Channel |
| OPT-OCH | Optical Power Transmitted (in dBm) - Optical Channel |
| ORLAVG-OTS | Optical Return Loss Average (in dB) - Optical Transmission Section |
| ORLMAX-OTS | Optical Return Loss Maximum (in dB) - Optical Transmission Section |
| ORLMIN-OTS | Optical Return Loss Minimum (in dB) - Optical Transmission Section |
| ORL-OTS | Optical Return Loss (in dB) - Optical Transmission Section |
| OUTFRAMES-E | Remote out frames, Ethernet |
| OUTFRAMESERR-E | Out errored frames, Ethernet |
| PFBERE-OTU | Post-FEC bit error rate estimate, optical channel transport unit |
| PRFBERMAX-OTU | Max Pre-FEC bit error rate, optical channel transport unit |
| PRFBER-OTU | Pre-FEC bit error rate, optical channel transport unit |
| SEFS-OTU | Severely errored frame seconds, optical channel transport unit |
| SES-E | Severely errored seconds, Ethernet |
| SES-ODU | Severely errored seconds, optical channel data unit |
| SES-OTU | Severely errored seconds, optical channel transport unit |
| UAS-E | Unavailable seconds, Ethernet |
| UAS-ODU | Unavailable seconds, optical channel data unit |
| UAS-PCS | Unavailable seconds, physical coding sublayer |
| BBES | Background Block Errors Seconds |
| BBE-SFE | Background Block Error Section Layer Far End. |
| CORRFEC | Corrected FEC - This is the count of the corrected number of bits |
| CSES | Consecutive Severely Errored Seconds |
| CSESL | Consecutive Severely Errored Seconds Line |
| CV | Coding Violations |
| CVL | Coding Violations Line |
| ES | Errored Seconds |
| ESL | Errored Seconds Line |
| ESS | Errored seconds, Section layer |
| ES-SFE | Errored Seconds Section Layer Far End |
| LBC | Laser Bias Current |
| OPR | Optical Power Received |
| OPT | Optical Power Transmitted |
| SEFS | Severely errored frame second |
| SEMS | Severely errored, multiframed seconds |
| SES | Severely Errored Seconds Line |
| SESL | Severely Errored Seconds Line |
| SESS | Severely Errored Seconds Section |
| SES-SFE | Severely Errored Seconds Section Layer Far End |
| UAS | Unavailable Seconds |
| UASL | Unavailable Seconds Line Layer |
| UASS | Unavailable Seconds Line Section |
| CV-ODU | Code violation, optical channel data unit. |
| CV-OTU | Code violation, optical channel transport unit |
| TEMP | Operating temperature |
| CPU | Processor load |
| MEM | Memory usage |
| CAM | Content Addressable Memory table |

The following Table 2 illustrates a sample KPI result table that the network element 100, 200 captures during the self-learning period to prepare the golden profile.

| Time | KPI Name | | | |
|---|---|---|---|---|
| | Temp (° C.) | CPU Load (%) | CRC/ Errors | MAC count ... |
| 12:00:15 AM | 25 | 35 | | |
| 12:00:30 AM | 22 | 30 | | |
| 12:00:45 AM | 22 | 29 | | |
| 01:00:00 AM | 23 | 37 | | |
| 01:00:15 AM | 34 | 38 | | |
| 01:00:30 AM | 22 | 40 | | |
| 01:00:45 AM | 26 | 35 | | |
| — | — | | | |
| — | — | | | |
| 11:00:45 PM | 34 | 65 | | |
| Golden KPI outer threshold (Min) | −2 | 22 | | |
| Golden KPI inner threshold (Min) | 10 | 28 | | |
| Golden KPI inner threshold (Max) | 42 | 44 | | |
| Golden KPI Outer threshold (Max) | 54 | 50 | | |

Threshold Learning Process

Figure 7:
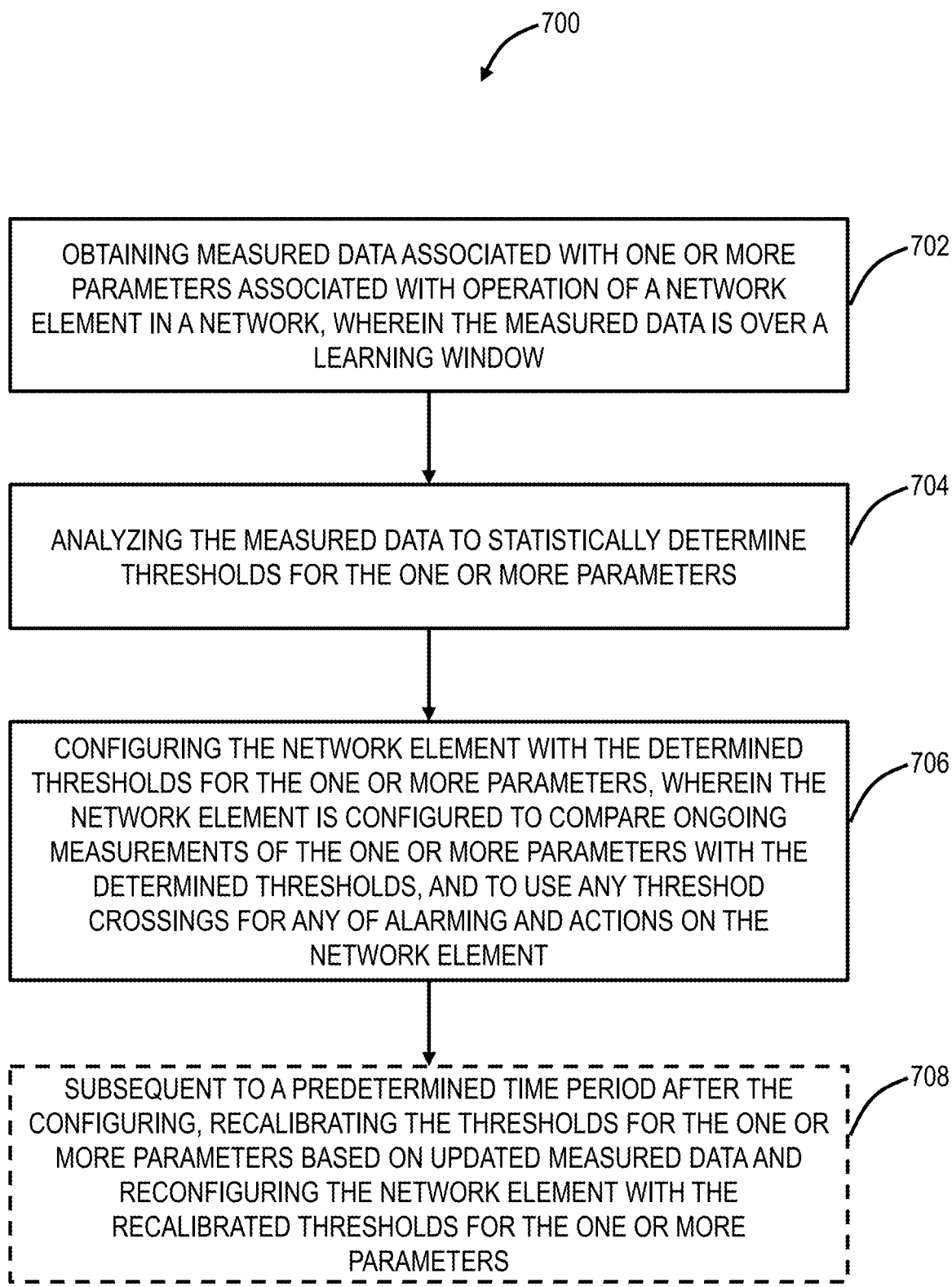
FIG. 7 is a flowchart of a threshold learning process.

FIG. 7 is a flowchart of a threshold learning process 700. The threshold learning process 700 can be implemented as a method, via a non-transitory computer-readable medium having instructions stored thereon for programming a processing device to perform the steps, and through the network element 100, 200. The threshold learning process 700 includes obtaining measured data associated with one or more parameters associated with operation of a network element in a network, wherein the measured data is over a learning window (step 702); analyzing the measured data to statistically determine thresholds for the one or more parameters (step 704); and configuring the network element with the determined thresholds for the one or more parameters, wherein the network element is configured to compare ongoing measurements of the one or more parameters with the determined thresholds, and to use any threshold crossings for any of alarming and actions on the network element (step 706). The threshold learning process 700 can further include, subsequent to a predetermined time period after the configuring, recalibrating the thresholds for the one or more parameters based on updated measured data and reconfiguring the network element with the recalibrated thresholds for the one or more parameters (step 708).

The determined thresholds can be automatically determined utilizing a statistical technique on the measured data which establishes a fence where being outside of the fence is indicative of a deviation. The one or more parameters can include Performance Monitoring (PM) data and Key Performance Indicators (KPIs). The one or more parameters can relate to any of optical layer parameters, Time Division Multiplexing (TDM) layer parameters, and packet layer parameters. The determined thresholds can include an inner fence indicative of a minor deviation and an outer fence indicative of a major deviation. The network element can be a first network element and the network includes a second network element, wherein the first network element and the second network element include different thresholds for a same parameter.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network management system comprising:
   at least one processor and memory comprising instructions that, when executed, cause the at least one processor to
      obtain measured data from a plurality of network elements in a network, wherein the measured data is associated with Operations, Administration, and Maintenance (OAM) functions for each of the plurality of network elements, wherein an OAM function of the OAM functions includes Performance Monitoring (PM) data used to monitor a communication channel or service operating at a given layer in the network, between the plurality of network elements, analyze the measured data to statistically determine thresholds for any of the OAM functions including the PM data, and auto-apply the determined thresholds on the plurality of network elements for the PM data, wherein the determined thresholds are changes to either default values or user-configured values, each network element having its own corresponding determined thresholds based on its own actual operating conditions, wherein the plurality of network elements utilize the determined thresholds to compare ongoing measured data for threshold crossings for any of alarms and actions, such that the alarms and actions are based on deviation from a baseline of the actual operating conditions.

2. The network management system of claim 1, wherein at least two network elements include different values for thresholds for at least one OAM functions.

3. The network management system of claim 1, wherein the instructions that, when executed, further cause the at least one processor to subsequent to the determined thresholds being auto-applied recalibrate the determined thresholds based on new measured data from any of the plurality of network elements.

4. The network management system of claim 1, wherein the OAM functions relate to any of optical layer parameters, Time Division Multiplexing (TDM) layer parameters, or packet layer parameters.

5. The network management system of claim 1, wherein the determined thresholds include an inner fence indicative of a minor deviation and an outer fence indicative of a major deviation.

6. The network management system of claim 1, wherein the determined thresholds for a given network element are based on a role of the given network element in the network.

7. The network management system of claim 1, wherein at least two network elements include different values for thresholds for the PM data which relate to any of optical layer parameters, Time Division Multiplexing (TDM) layer parameters, or packet layer parameters.

8. A non-transitory computer-readable medium comprising instructions that, when executed, cause at least one processor to perform steps of:

obtaining measured data from a plurality of network elements in a network, wherein the measured data is associated with Operations, Administration, and Maintenance (OAM) functions for each of the plurality of network elements, wherein an OAM function of the OAM functions includes Performance Monitoring (PM) data used to monitor a communication channel or service operating at a given layer in the network, between the plurality of network elements, analyzing the measured data to statistically determine thresholds for any of the OAM functions including the PM data, and auto-applying the determined thresholds on the plurality of network elements for the PM data, wherein the determined thresholds are changes to either default values or user-configured values, each network element having its own corresponding determined thresholds based on its own actual operating conditions, wherein the plurality of network elements utilize the determined thresholds to compare ongoing measured data for threshold crossings for any of alarms and actions are based on deviation from a baseline of the actual operating conditions.

9. The non-transitory computer-readable medium of claim 8, wherein at least two network elements include different values for thresholds for at least one OAM functions.

10. The non-transitory computer-readable medium of claim 8, wherein the steps further include subsequent to the auto-applying, recalibrating the determined thresholds based on new measured data from any of the plurality of network elements.

11. The non-transitory computer-readable medium of claim 8, wherein the OAM functions relate to any of optical layer parameters, Time Division Multiplexing (TDM) layer parameters, or packet layer parameters.

12. The non-transitory computer-readable medium of claim 8, wherein the determined thresholds include an inner fence indicative of a minor deviation and an outer fence indicative of a major deviation.

13. The non-transitory computer-readable medium of claim 8, wherein the determined thresholds for a given network element are based on a role of the given network element in the network.

14. The non-transitory computer-readable medium of claim 8, wherein at least two network elements include different values for thresholds for the PM data.

15. A method comprising steps of:

obtaining measured data from a plurality of network elements in a network, wherein the measured data is associated with Operations, Administration, and Maintenance (OAM) functions for each of the plurality of network elements, wherein an OAM function of the OAM functions includes Performance Monitoring (PM) data used to monitor a communication channel or service operating at a given layer in the network, between the plurality of network elements, analyzing the measured data to statistically determine thresholds for any of the OAM functions including the PM data, and auto-applying the determined thresholds on the plurality of network elements for the PM data, wherein the determined thresholds are changes to either default values or user-configured values, each network element having its own corresponding determined thresholds based on its own actual operating conditions, wherein the plurality of network element: utilize the determined thresholds to compare ongoing measured data for threshold crossings for any of alarms and actions, such that the alarms and actions are based on deviation from a baseline of the actual operating conditions.

16. The method of claim 15, wherein at least two network elements include different values for thresholds for at least one OAM function which relates to any of optical layer parameters, Time Division Multiplexing (TDM) layer parameters, or packet layer parameters.

17. The method of claim 15, wherein the analyzing is based on a learning window where network changes are observed.

* * * * *